No. 736,989. PATENTED AUG. 25, 1903.
E. MASKE.
CLEANING DEVICE FOR WINDOWS.
APPLICATION FILED DEC. 9, 1902.
NO MODEL.

WITNESSES
INVENTOR
Emil Maske
ATTORNEYS

No. 736,989. Patented August 25, 1903.

UNITED STATES PATENT OFFICE.

EMIL MASKE, OF TRONDHJEM, NORWAY.

CLEANING DEVICE FOR WINDOWS.

SPECIFICATION forming part of Letters Patent No. 736,989, dated August 25, 1903.

Application filed December 9, 1902. Serial No. 134,537. (No model.)

*To all whom it may concern:*

Be it known that I, EMIL MASKE, a subject of the King of Sweden and Norway, residing at Trondhjem, Norway, have invented certain new and useful Improvements in Cleaning Devices for Windows; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a window-cleaning device of the kind that consists of a rod or beam extending transversely of and movable up and down across the window and serving as a holder for a wiping-strip, which is kept pressed against the plate-glass, so as to wipe dew or the like off the window-pane by the motion of the rod or holder.

My invention consists in arranging the cleaning device in such a way as to effect its upward motion by means of a self-acting roller or lifter, from which the holder is suspended, whereas I provide on either side of the window guiding-rails designed during the descent of the wiper to keep the same in contact with the plate-glass and during its ascent to keep it away from the same.

The invention may be carried out as illustrated in the annexed drawings, in which—

Figure 1:
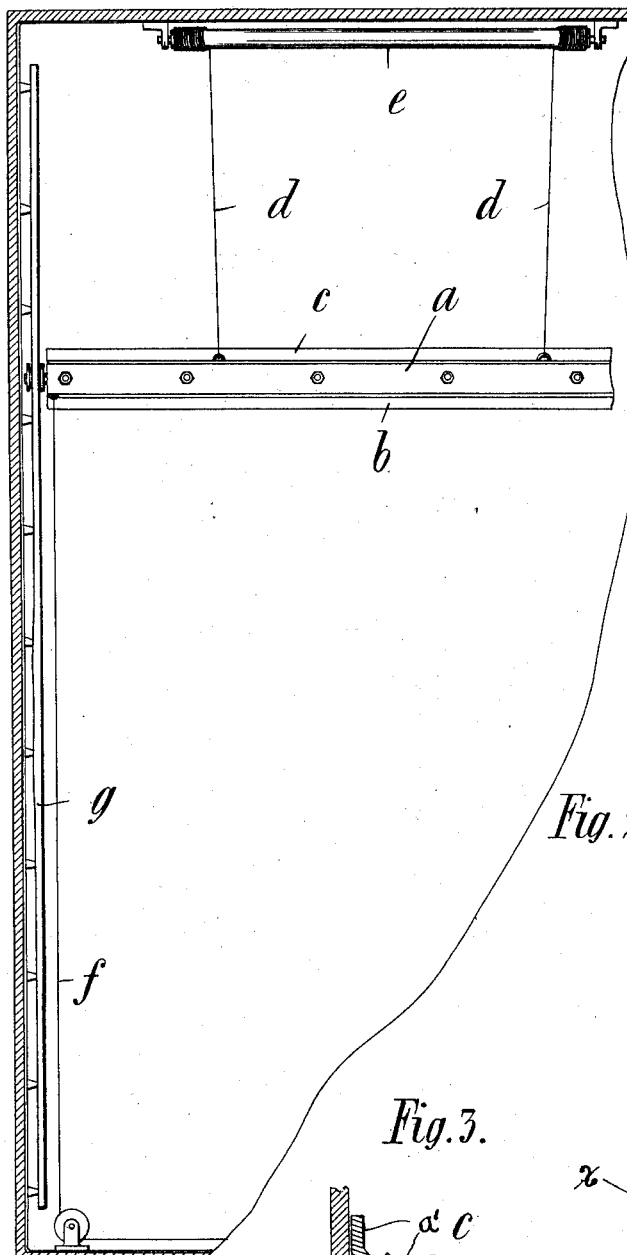
Figure 2:
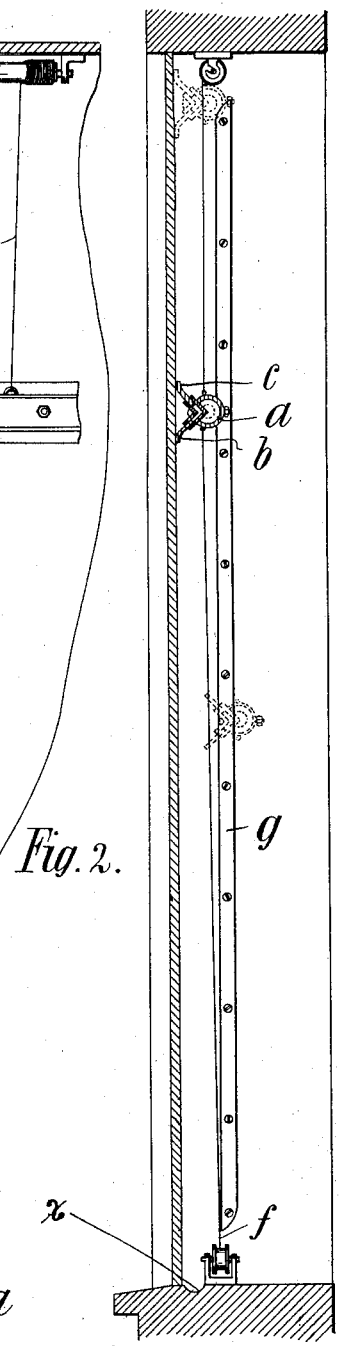
Figure 3:
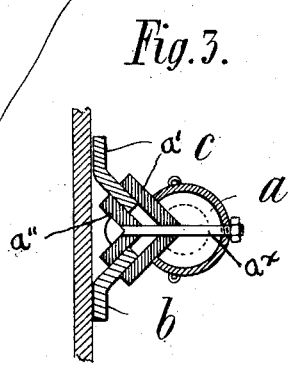

Figure 1 is an elevation of part of a plate-glass window. Fig. 2 is a vertical section of the same, and Fig. 3 is a detail sectional view of the cleaning device.

The rod or holder $a$, of considerable cross-sectional dimensions, may be constructed, for instance, of plate-iron and provided with two strips $b$ and $c$ of rubber or any other suitable soft or yielding material, said strips $b$ and $c$ being held between angle-pieces $a'$ $a''$, secured to the rod $a$ by a bolt $a^\times$. Said rod is suspended by strings $d$, wound upon a metal tube $e$, in which is arranged a spiral spring in the same manner as in a spring-roller for window-blinds, said rod or holder remaining, when not in use, suspended beneath the top of the window-frame. Guiding-rails $g$, one on each side of the window, are provided for the ends of the rod $a$.

Whenever it is desired to clean the window-pane of dew, &c., it suffices to pull two cords or strings $f$, running in pulleys, whereby the wiper is caused to descend in horizontal position along the window-pane and under the guiding-rails, being at the same time forced against the glass, so as to press the rubber strips in contact with the same by means of the two guiding-rails, whereby any damp or water, &c., is swept down and may be led away by suitable grooves or conduits, such as $x$. When once arrived at its lowermost position, the wiper will be returned to its elevated position by the action of the roller or lifter and kept away from the window-pane by the guiding-rails, these being cut with slanting extremities and obliquely secured to the window-frame, so as to force the wiper to take its way along the outer side of the guiding-rails. At the top of the frame it will likewise of its own accord get into the proper position.

I claim—

1. In a cleaning device for windows, a holder for the wiping-strip, which holder is suspended from a spring-roller and guided in its descent upon the inner, in its ascent upon the outer side of guiding-rails, one of which is secured on each side of the window.

2. In a cleaning device for windows, a rod, angle-pieces attached thereto, a wiping-strip carried by said pieces, guiding-rails for said rod secured to the window and each rail having oppositely-slanting extremities, substantially as described.

In witness whereof I have hereunto set my hand in presence of two witnesses.

EMIL MASKE.

Witnesses:
SARA CALDINN,
SAM BERG.